Feb. 10, 1931. J. D. MADARASZ 1,791,731
WIND ENGINE
Filed July 23, 1928  3 Sheets-Sheet 1

Inventor
Julius D. Madarasz.

Attorney

Feb. 10, 1931. J. D. MADARASZ 1,791,731
WIND ENGINE
Filed July 23, 1928 3 Sheets-Sheet 2
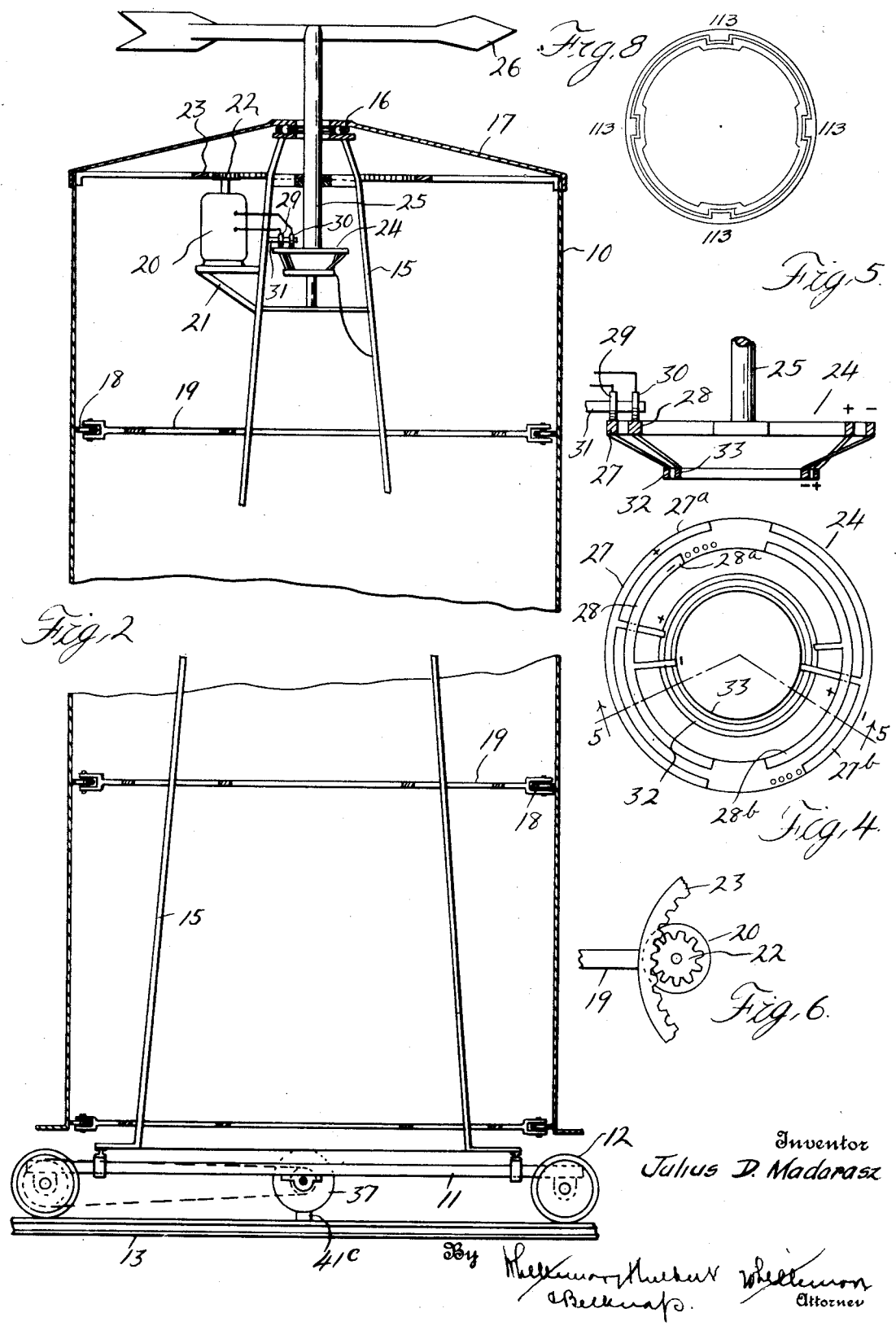
Inventor
Julius D. Madarasz Feb. 10, 1931. J. D. MADARASZ 1,791,731
WIND ENGINE
Filed July 23, 1928 3 Sheets-Sheet 3
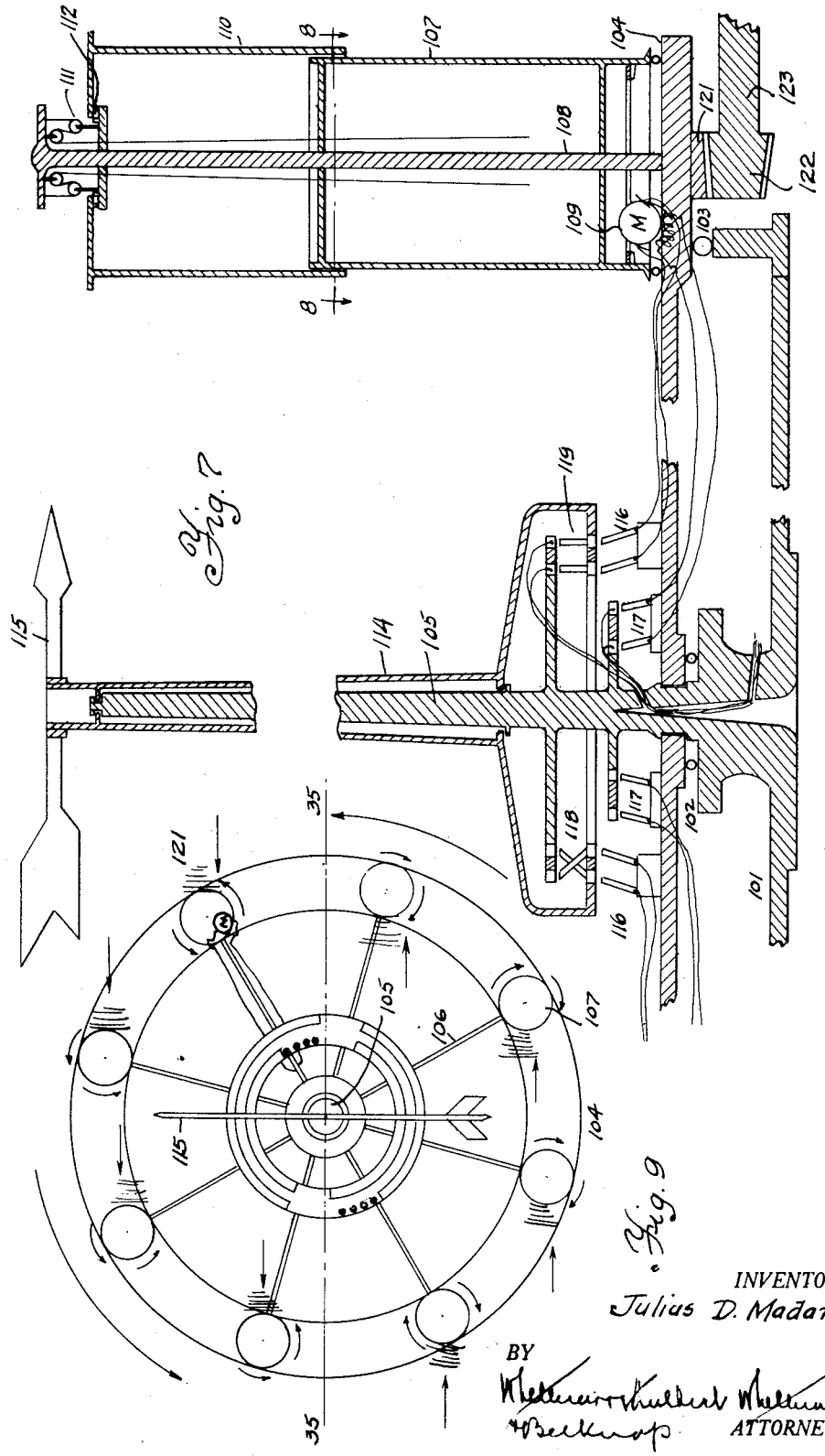
INVENTOR.
Julius D. Madarasz.
BY
ATTORNEY.

Patented Feb. 10, 1931

1,791,731

UNITED STATES PATENT OFFICE

JULIUS D. MADARASZ, OF ROYAL OAK, MICHIGAN, ASSIGNOR TO MADARAS ROTOR POWER CORPORATION, OF DETROIT, MICHIGAN, A CORPORATION OF MICHIGAN

WIND ENGINE

Application filed July 23, 1928. Serial No. 294,709.

The invention relates to wind engines or devices for producing power by the action of the wind or other fluid, and is in part a continuation of my co-pending application, Serial No. 6,961, filed February 5, 1925, entitled Wind engines.

The principal object of my invention is to provide an apparatus capable of being used for developing power on a large scale from the force of the wind. In attaining this end I have utilized a well known principle, the Magnus effect, but have employed the same in a novel manner. The scientific principle above referred to is that the action of a wind current upon a rotating cylinder produces a condensation on the side of the cylinder rotating against the current of air and a rarefaction on the opposite side rotating with the current of air. The combined effect of the condensation or pressure upon one side of the cylinder and the rarefaction or vacuum upon the opposite side tends to produce a bodily movement of the cylinder in a direction transverse to the direction of the air current.

My invention consists in arranging a plurality of cylinders or other equivalent symmetrical elongated rotors in such a manner that each can rotate about its own axis and also have a bodily movement in a fixed path, which preferably is a circular orbit. The rotors are of a size sufficient to present a large surface area to the wind and are arranged so that the wind strikes against the same in all positions in the orbit. Each cylinder is provided with means for rotating the same about its axis and the force developed by the action of the wind upon the rotating cylinder tends to move the same bodily in its orbital path. The cylinders, however, are not continuously rotated but are caused to be reversed at predetermined intervals during the orbital movement thereof, the arrangement being such that during one-half of the cycle of orbital movement they are rotating in one direction and during the other half they are rotating in the opposite direction. Means is therefore provided for reversing the rotation of each cylinder when it has reached the extreme position in a direction transverse to the direction of the wind. Thus each cylinder is acted upon during approximately one-half of its cycle by a force urging it in one direction transverse to the direction of the wind and during the other half cycle is acted upon by a force urging it in the opposite direction. When the bodily movement of the cylinders is constrained to a circular orbit, they are moved continuously in the circular path by the periodic axial rotation of the same. Since the point in the orbit for reversal of the rotation depends upon the direction of the wind, the reversing mechanism is preferably controlled by a wind vane or other device operated by the wind.

In the drawings

Figure 1 is a plan view of an apparatus constructed in accordance with my invention.

Figure 4 is a plan view of the mechanism for reversing the motor.

Figure 5 is a transverse section on the line 5—5 of Figure 4.

Figure 6 illustrates the mechanism for rotating the rotors.

Figure 7 is a diagrammatic view of a modified device embodying my invention.

Figure 8 is a transverse section on the line 8—8 of Figure 7.

Figure 9 is a plan view of the device of Figure 7.

Figure 2:
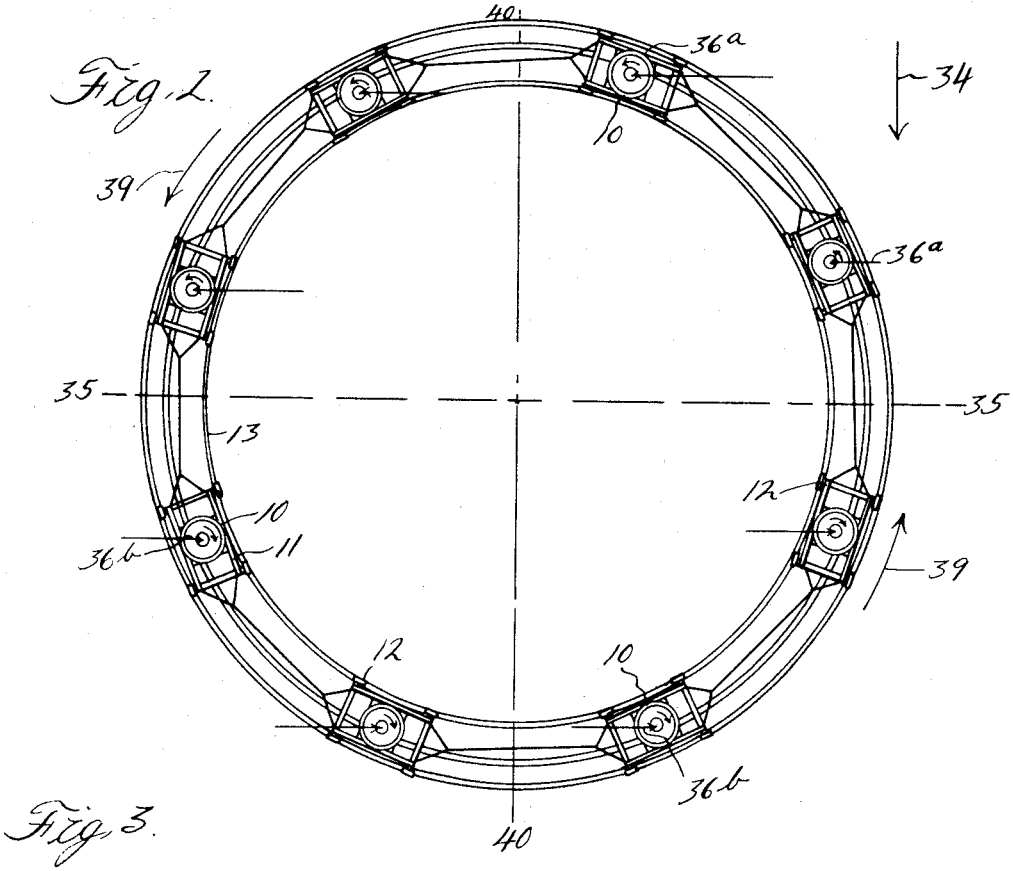
Figure 2 is an enlarged sectional elevation of one of the rotors.

Referring now to the embodiment of the invention illustrated in the drawings, the apparatus comprises a plurality of rotatable cylinders or other suitable rotors 10, each of which is rotatably mounted upon a suitable base or frame 11. This frame is provided with wheels 12 for mounting the same upon a track 13, which track extends in an endless circuit about a central point and is preferably circular. The wheeled frames 11 are connected together by suitable means such as the cables 14 so that all of the frames move together on the track 13.

For mounting each of the cylinders 10 each frame is provided with a suitable tower 15 carrying at its upper end a bearing 16 for supporting the weight of the cylinder 10. The cylinder has an upper end portion 17 supported on the bearing 16 and the cylindrical side portions surrounding the tower. For guiding the cylinder in its rotative movements there are provided a series of roller guides 18 supported by arms 19 extending radially outward from the tower 15. Any suitable means may be used for rotating the cylinder 10 but in the preferred embodiment of the invention each cylinder is provided with an independent electric motor 20 of a reversible type mounted upon a frame 21 on the tower and carrying a pinion 22, meshing with an internal gear 23 at the upper end of the rotor. 24 is an electric control switch mounted on a shaft 25 extending through the upper end of the cylinder and connected to a wind vane 26. The switch 24 may be of any suitable construction adapted to reverse the electric motor twice during the orbital cycle of the rotor and as shown it comprises two rings 27 and 28 with which the two rollers 29 and 30 contact. The rollers are carried by an arm 31 extending inwardly from the tower frame 15. Each ring has two segmental contacting portions separate from each other, the outer segments 27a and 27b and the inner segments 28a and 28b. 32 and 33 are slip rings carrying opposite potentials, these rings being connected to the contacting segments in such a manner that the two outer segments 27a and 27b carry opposite potentials, while the two inner segments 28a and 28b also carry opposite potentials. Thus, when the rollers 29 and 30 leave their respective segments 27a and 28a and contact with the segments 27b and 28b the potential on each of the rollers is reversed, thereby causing the reversal of the electric motor in the usual manner. The switch 24 is rotatably mounted so that its position is determined by the direction of the wind, while the rollers are fixedly mounted on the frame. Therefore, during one complete cycle of the frame in its orbital path the rollers make a complete rotation relative to the switch 24 and cause the motor to rotate in one direction for half of the cycle and in the other direction for the other half of the cycle. The arrangement is preferably such that the reversal takes place when the motor is in that portion of its orbital cycle where it is moving parallel to the direction of the wind.

With the parts as thus far described, the operation of the device is as follows:

Assuming that the wind is in the direction shown by the arrow 34 in Figure 1, then all of the cylinders above the line 35—35 which is transverse to the direction of the wind are rotating counter-clockwise, while those below said line are rotating clockwise. The forces resulting from the Magnus effect always tend to act at approximately right angles to the direction of the wind and these forces are represented by the arrows 36a and 36b, the former which point to the left designating the forces above the line 35—35 and the latter which point to the right designating the forces below the line. By referring to the drawings, it will be observed that all of these forces tend to produce a bodily movement of the rotors in a counter-clockwise direction as represented by the arrow 39. The maximum effective force on the rotors is obtained when the rotors pass the line 40—40, while the minimum effective force occurs when they pass the line 35—35. Reversal of the rotors therefore takes place in the vicinity of the line 35—35 where they are traveling substantially parallel to the direction of the wind.

With the device constructed as outlined above, the power available for use must be developed by the movement of the wheeled frames on the track 13. The velocity of the wind will of course affect the force acting upon each cylinder tending to move the same, and since the velocity of the wind is a variable factor, it is preferable to design the apparatus to operate most efficiently at some average velocity of the wind, such for example as 13 miles per hour. The cylinders are rotated preferably at a constant speed, which varies only upon the reversal thereof and this speed is so determined that the maximum force is obtained when the wind velocity is 13 miles per hour and when the velocity falls below this amount the effective force is diminished, although, if the velocity is increased the effective force is not proportionately increased.

In order to make available for practical purposes the power developed by my apparatus, it is preferable to convert the power into electrical energy and this is done by equipping each of the wheeled frames with electric generators 37 driven by the wheels 12. The generators 37 are preferably of the three-phase induction type and adapted to operate at substantially constant speed. The generators from each of the units are electrically connected into a common line in a suitable manner, as for example by employing trolleys 41a, 41b and 41c engaging the conducting rails 42a, 42b and 42c. A certain amount of the power produced in this manner will be required to operate the electric motors on the rotors but the balance is available for other useful work.

The amount of power developed by my improved motor will of course depend upon the velocity of the wind. It is therefore preferable to connect the generators into a power line obtained from some other source for in this manner the increased velocity of the wind will create additional electrical power without substantially increasing the velocity of travel of the wheeled frames around the track. If the wind velocity drops below a predetermined value, it will also be preferable to provide an automatic electrical cut-out of conventional type to prevent the generators from functioning as motors and drawing current from the outside power line to propel the wheeled frames around the track.

In the modified construction, as illustrated in Figures 7, 8 and 9, the rotors instead of being mounted on separate cars or trucks are all mounted on a single platform or turntable. Thus as specifically shown 101 is a main base supporting the device. It is provided with bearings 102 and 103, preferably ball bearings, on which the main body of the device rotates. This main body consists of a horizontal wheel or platform 104 rotatably mounted on a central shaft 105 and provided with spokes 106, at the end of each of which is mounted a vertical cylinder 107 arranged on a shaft 108, which cylinder is caused to rotate rapidly by a suitable electric motor 109. The platform is also provided with a gear 121 adapted to engage with a pinion 122 attached to a shaft 123 for transmitting motion of the platform 104 to any desired point at which it is designed to apply power. If desired, the cylinder 107 may be formed in two parts, the upper part 110 sliding outside of the lower part as shown in Figure 7 and being adapted to be raised and lowered by pulleys 111 and supported by ball bearings 112 so that the cylinder may be raised or lowered for any convenient purpose. In that case the two cylinders are joined together by slides 113 (see Figure 8) so that the upper cylinder will be driven by the lower cylinder or any other suitable means for causing the two cylinders to rotate together may be employed without departing from my invention, or if desired the device for raising and lowering the cylinders may be dispensed with entirely and single cylinders of full height may be employed. A mast 114 of any suitable height carring a weather vane 115 at the top is revolubly mounted on the shaft 105. The motors 109 are operated and controlled by a series of brushes 116, 117, 118 and 119. The brushes 116 control the armatures of the motors and the brushes 117 the fields. The brushes 118 and 119 are reversing brushes to reverse the direction of motion of the motors at each half revolution. The motors 109 are reversible and are preferably of the self-breaking type, that is, the type in which the armature is short-circuited through a resistance whenever the current is shut off, thus turning the motor into a generator and producing a powerful breaking effect. Further explanation of the reversing mechanism is not necessary since it may be of any suitable well known type, or it may be constructed in accordance with the above description given in connection with Figures 4 and 5.

In the drawings, it is to be understood that the size of the controlling mechanism in its relation to that of the cylinders is very greatly exaggerated for the purpose of illustrating the mechanism, the control device being mounted at any desired height and being only of sufficient size to contain the necessary controlling mechanism and being formed light and easily revoluble so as to be controlled by the weather vane 115.

Figure 3:
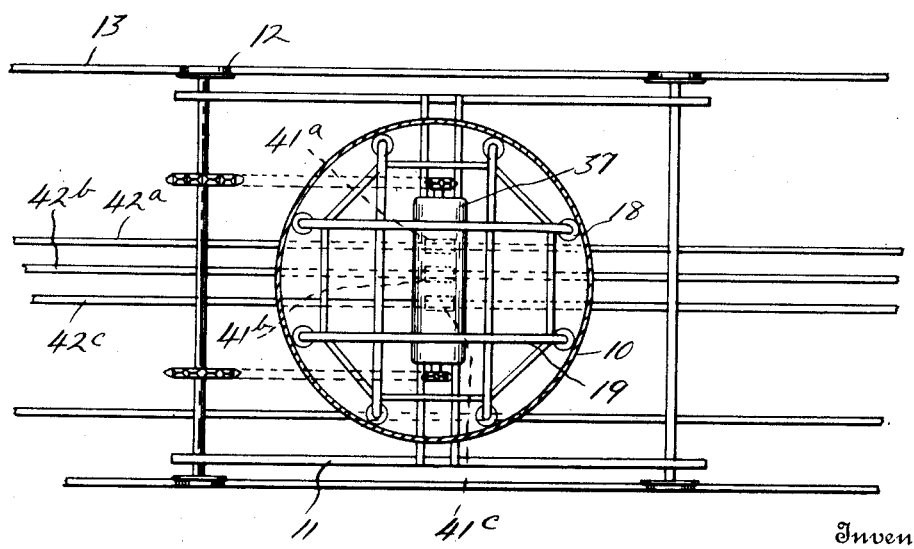
Figure 3 is an enlarged sectional plan view of a rotor.

The operation of the modified device, shown in Figures 7 to 9, is substantially the same as the operation of the preferred construction shown in Figures 1 to 3 inclusive and need not again be described.

While in the above description I have set forth certain specific constructions, it is to be understood that my invention is not to be necessarily construed as limited to such specific construction except in the light of the claims appended hereto.

What I claim as my invention is:

1. The combination with a rotor bodily movable through a predetermined path between points laterally spaced with respect to the direction of the wind, means for guiding said rotor through said predetermined path and means for reversely rotating said rotor substantially at said points to reverse the direction of propulsion between said points.

2. A wind motor comprising a rotor bodily movable through a predetermined endless path between points laterally spaced with respect to the direction of the wind, and means for reversing the direction of rotation of said rotor while moving in a direction substantially parallel to the direction of the wind.

3. A wind motor comprising a rotor bodily movable through a predetermined path between points oppositely located in a plane substantially at right angles to the direction of the wind, and means for reversing the direction of rotation of said rotor while moving in a direction substantially parallel to the direction of the wind.

4. A wind motor comprising a rotor bodily movable through a predetermined path, and means responsive to the changes in the direction of the wind for reversing the rotation of said rotor when the direction of bodily movement of said rotor is in a predetermined relation to the direction of the wind.

5. A wind motor comprising a rotor bodily movable through a predetermined path, and means responsive to the changes in the direction of the wind for reversing the rotation of said rotor when said rotor is moving bodily in a direction substantially parallel to the direction of the wind.

6. A wind motor comprising a rotor bodily movable through a predetermined path, means for rotating said rotor, means for reversing the rotation of said rotor at predetermined points in its path of bodily movement and means for shifting the reversing points of said rotor in accordance with variations of wind direction.

7. A wind motor comprising a plurality of rotors, means for interconnecting said rotors to compel simultaneous bodily movement through a predetermined path, said rotors being rotatable about parallel axes and means for rotating the respective rotors in one direction while on the windward side of the path and in the opposite direction while on the leeward side thereof.

8. A wind motor comprising a rotor bodily movable in a horizonal plane through a substantially circular path, means for rotating said rotor about its axis and means controlled by the direction of the wind for reversely rotating said rotor at each semi-revolution through said circular path.

9. A wind motor comprising a circular track, a plurality of interconnected cars arranged at intervals around said track, a vertical cylinder carried by each car, means for rotating said cylinder and means for reversing the direction of rotation of each cylinder while the car on which it is mounted is traveling substantially parallel to the direction of the wind.

10. A wind motor comprising a plurality of vertical rotors arranged for bodily movement through a predetermined horizontal path, and means for causing all rotors to rotate in the same direction on one side of a medial line transverse to the wind direction and for causing all rotors on the opposite side of said medial line to rotate in the opposite direction.

11. A wind motor comprising a plurality of rotors mounted for bodily movement through a predetermined horizontal path, an electric motor for driving each of said rotors and means responsive to the direction of the wind for controlling said motor so that it is caused to reverse at each half revolution of the rotor through its horizontal path.

12. A wind motor comprising a plurality of rotor cylinders mounted for bodily movement in a horizontal plane, means associated with each rotor for causing the same to rotate in one direction for one-half of its movement in said horizontal path and in the opposite direction for the other half of its movement, means for shifting said associated mechanism corresponding to the shifting of the wind direction and means for generating power from the bodily movement of said rotors.

13. In combination with a fixed base, a revoluble platform mounted on said base, a cylinder rotatably mounted near the margin of said platform, means for giving a rotary motion to said cylinder, and means for reversing the motion of said cylinder at each semi-revolution of said platform.

14. In combination with a fixed base, a revoluble platform mounted on said base, a cylinder rotatably mounted on said base, means for giving a rotary motion to said cylinder, and means for automatically reversing the motion of said cylinder at each semi-revolution of said platform.

15. In combination with a fixed base, a revoluble platform mounted on said base, a plurality of cylinders rotatably mounted near the margin of said platform, means for giving a rotary motion to said cylinders, and means for automatically reversing the motion of said cylinders at each semi-revolution of said platform.

16. In combination with a fixed base, a revoluble platform mounted on said base, a plurality of cylinders rotatably mounted near the margin of said platform, means for giving a rotary motion to said cylinders, means for automatically reversing the motion of said cylinders at each semi-revolution of said platform, and means for shifting the reversing points of said cylinders at each semi-revolution of said platform, so that a line passing through said reversing points will be at all times approximately normal to the direction of the wind.

17. In combination with a fixed base, a revoluble platform mounted on said base, a plurality of cylinders rotatably mounted near the margin of said platform, means for giving a rotary motion to said cylinders, means for automatically reversing the motion of said cylinders at each semi-revolution of said platform, and automatically operated means for shifting the reversing points of said cylinders at each semi-revolution of said platform, so that a line passing through said reversing points will be at all times normal to the direction of the wind.

18. In combination with a fixed base, a revoluble platform mounted on said base, a plurality of cylinders rotatably mounted near the margin of said platform, means for giving a rotary motion to said cylinders, means for automatically reversing the motion of said cylinders at each semi-revolution of said platform, and means automatically controlled by the wind for shifting the reversing points of said cylinders at each semi-revolution of said platform, so that a line passing through said reversing points will be at all times normal to the direction of the wind.

19. In combination with a fixed base, a revoluble platform mounted on said base, a cylinder rotatably mounted near the margin of said platform, a motor for giving a rotary motion to said cylinder, and means for reversing the motion of said motor at each semi-revolution of said platform.

20. In combination with a fixed base, a revoluble platform mounted on said base, a cylinder rotatably mounted near the margin of said platform, a reversible motor for giving a rotary motion to said cylinder, and means for automatically reversing said motor at each semi-revolution of said platform.

21. In combination with a fixed base, a revoluble platform mounted on said base, a plurality of cylinders rotatably mounted near the margin of said platform, a reversible motor for giving a rotary motion to said cylinder, and automatically operated means for reversing said motor at each semi-revolution of said platform.

22. In combination with a fixed base, a revoluble platform mounted on said base, a plurality of cylinders rotatably mounted near the margin of said platform, a reversible motor for giving a rotary motion to said cylinders, means for reversing said motor at each semi-revolution of said platform, and automatically operated means for shifting the reversing points of said motor at each semi-revolution of said platform so that a line passing through said reversing points will be at all times normal to the direction of the wind.

23. In combination with a fixed base, a revoluble platform mounted on said base, a plurality of cylinders rotatably mounted near the margin of said platform, a reversible motor for giving a rotary motion to said cylinders, means for automatically reversing said motor at each semi-revolution of said platform, and automatically operated means for shifting the reversing points of said motor at each semi-revolution of said platform so that a line passing through said reversing points will be at all times normal to the direction of the wind.

24. In combination with a fixed base, a revoluble platform mounted on said base, a plurality of cylinders rotatably mounted near the margin of said platform, a reversible motor for giving a rotary motion to said cylinders, means for automatically reversing said motor at each semi-revolution of said platform, and means automatically controlled by the wind for shifting the reversing points of said motor at each semi-revolution of said platform, so that a line passing through said reversing points will be at all times normal to the direction of the wind.

25. A wind motor comprising in combination, a wheel equipped with a plurality of rotor cylinders circumferentially spaced on axes parallel with its axis of rotation, and means for rotating the respective cylinders in opposite directions, in one direction while being carried by the wheel at the windward side thereof and in the opposite direction at the leeward side.

26. A wind motor comprising in combination, a wheel equipped with a plurality of rotor cylinders circumferentially spaced on axes parallel with its axis of rotation, and means for rotating the respective cylinders in opposite directions, in one direction while being carried by the wheel at the windward side thereof and in the opposite direction at the leeward side, and means controlled by the direction of the wind for effecting said relative rotation of the cylinders in conformance with changes in the direction of the wind.

In testimony whereof I affix my signature.
JULIUS D. MADARASZ.